United States Patent [19]

LeBoeuf

[11] 4,246,389
[45] Jan. 20, 1981

[54] CONTACT LENS COMPOSITION HAVING INCREASED OXYGEN PERMEABILITY

[75] Inventor: Albert R. LeBoeuf, Sturbridge, Mass.

[73] Assignee: American Optical Corporation, Southbridge, Mass.

[21] Appl. No.: 51,935

[22] Filed: Jun. 25, 1979

[51] Int. Cl.³ .................. C08F 230/08; G03B 21/46
[52] U.S. Cl. .......................... 526/279; 351/160 H
[58] Field of Search .................. 526/279; 351/160 H

[56] References Cited

U.S. PATENT DOCUMENTS

| | | | |
|---|---|---|---|
| 4,120,570 | 10/1978 | Gaylord | 526/279 |
| 4,139,513 | 2/1979 | Tanaka et al. | 526/279 |
| 4,139,692 | 2/1979 | Tanaka et al. | 526/279 |
| 4,152,508 | 5/1979 | Ellis et al. | 526/279 |

Primary Examiner—Harry Wong, Jr.
Attorney, Agent, or Firm—Jeremiah J. Duggan; Alan H. Spencer

[57] ABSTRACT

Acrylic siloxanes having the formula:

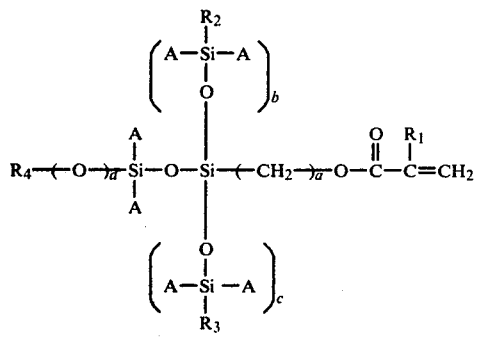

where $R_1$ is selected from the class of hydrogen or methyl groups, "a" is an integer from one to five, "b" is an integer from zero to seven, "c" is an integer from zero to two, "d" is an integer from zero to one, A is selected from the class of methyl or phenyl groups, $R_2$ is selected from the class of methyl or phenyl groups, $R_3$ and $R_4$ represent either no group (cyclic ring from "c" to "d") or methyl or phenyl groups, act synergistically with vinyl pyrrolidone and hydroxy ethyl methacrylate to provide optically clear moderate water containing contact lenses of substantially increased oxygen permeability.

8 Claims, No Drawings

CONTACT LENS COMPOSITION HAVING INCREASED OXYGEN PERMEABILITY

BACKGROUND OF THE INVENTION

Hydroxy ethyl methacrylate (HEMA) and vinyl pyrrolidone (VP) are monomers commonly used in the formulation of contact lens materials. Various formulations with or without modifiers are known having water contents ranging from as little as about 25% upwards to about 80% at equilibrium. It is also known that modifiers such as methyl methacrylate may be mixed with HEMA and VP. Such prior art materials exhibit an oxygen permeability directly proportional to the water content although a slight shift from material to material may occur because of monomer ratios and/or the amount and/or type of modifier present. For example, such materials will normally exhibit an oxygen permeability of about 6–9 Barrer units (BU) when the water content is in the range of 40%–45%; 10–14 BU when the water content is in the range of 50%–60%, and, 25–40 BU when the water content is in the range of 70%–90% of the contact lens material. The high water content soft contact lenses (60–90%) are known to have a number of disadvantages which include a rapid water evaporation rate; low structural strength; lower resistance to biological and/or chemical attack, poorer demensional stability and a propensity to discolor.

Recently, siloxane-containing materials which have good oxygen permeability have been suggested for contact lens use. However, such materials are known for their incompatibility with hydrophilic monomers such as HEMA and VP. Therefore, these materials have found applicability only in the hard contact lens field with polymers such as cellulose acetate butyrate (CAB) and polymethyl methacrylate (PMMA).

U.S. Pat. No. 4,152,508 issued May 1, 1979 discloses the group of acrylic siloxanes used in the present invention and teaches that they are useful for making hard contact lenses. Although HEMA and VP are identified as possible components of the hard lens compositions, their total combined content is limited to 20% or less of the total composition and other required components prevent the preparation of a soft contact lens material.

DESCRIPTION OF THE PRESENT INVENTION

It is an object of the present invention to provide a soft contact lens material having good oxygen permeability.

It is another object of the present invention to provide a soft contact lens having improved oxygen permeability and overcoming the disadvantages of the prior art.

I have discovered that certain acrylic siloxanes copolymerized with HEMA and VP unexpectantly produce optically clear copolymers containing about 35–50% water, at equilibrium, and exhibit a surprisingly high oxygen permeability of about 25–35 BU. The acrylic siloxanes useful in the present invention have the following formula

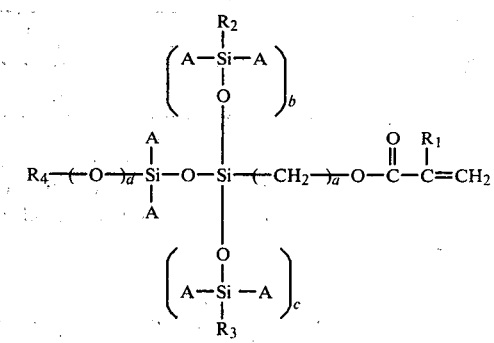

where $R_1$ is selected from the class of hydrogen or methyl groups, "a" is an integer from one to five, "b" is an integer from zero to seven, "c" is an integer from zero to two, "d" is an integer from zero to one, A is selected from the class of methyl or phenyl groups, $R_2$ is selected from the class of methyl or phenyl groups, $R_3$ and $R_4$ represent either no group (cyclic ring from "c" to "d") or methyl or phenyl groups. These acrylic siloxanes with either HEMA alone or VP alone do not polymerize to optically clear or even translucent polymers.

Formulations containing 35–50 wt.% VP; 20–45 wt.% HEMA; and, 25–45 wt.% siloxy methacrylate have been found suitable for practicing the present invention and 40%–45% VP and 20%–30% HEMA and 30%–40% methacryloyloxypropyl tris(trimethylsilyl)siloxane are preferred compositions. The preferred compositions have a water content in the order of 40%–50% at equilibrium and an oxygen permeability of over 30 BU.

Representative acrylic siloxanes suitable for practicing the present invention include methacryloyloxymethyl pentamethyldisiloxane; methacryloyloxypropyl tris(trimethylsilyl)siloxane; methacryloyloxymethyl heptamethylcyclotetrasiloxane; methacryloyloxypropyl heptamethylcyclotetrasiloxane; methacryloyloxypropyl(trimethylsilyl)decamethyl pentasiloxane; and methacryloyloxypropyl dodecamethyl pentasiloxane.

EXAMPLE

A copolymer of 40 wt.% VP, 20 wt.% HEMA, and 40 wt.% methacryloyloxypropyl tris(trimethylsilyl)siloxane (MPTTS) was prepared by polymerizing in the presence of 0.5 wt.% of t-butyl peroctoate as a catalyst at a temperature of 80° C. for two hours followed by two hours at 110° C.

A sample of the copolymer contained 42% water, at equilibrium, and was 0.2–0.3 mm. thick. The sample was measured for $O_2$ permeability in a water to water test cell and gave a value of 32 BU. A hard contact lens material commercially available as the "Boston Lens" and believed to be covered by U.S. Pat. No. 4,152,508 was similarly tested with a resulting permeability of about 13 BU. Other soft contact lens materials tested under the same conditions produced the following values

| Material | % $H_2O$ | $O_2$ Permeability (BU) |
| --- | --- | --- |
| Hydroxypropylmethacrylate | 22 | 2 |
| HEMA | 35 | 5.5 |
| 83% HEMA, 15% VP, 2% MA | 42 | 8.5 |

| Material | % H₂O | O₂ Permeability (BU) |
|---|---|---|
| 70% VP, 30% MMA | 70 | 25 |
| H₂O (Standard) | 100 | 78 |

When MPTTS was polymerized with only VP (40:60) or with only HEMA (30:70), the resulting copolymers were opaque and not therefore useful for contact lenses.

What is claimed is:

1. A contact lens material capable of being shaped and hydrated to a soft contact lens having a water content of 35 to 50 wt.% which consists essentially of the polymerization product of
   (a) 20 to 45 wt.% HEMA,
   (b) 35 to 50 wt.% VP, and
   (c) 25 to 45 wt.% of a compound having the formula

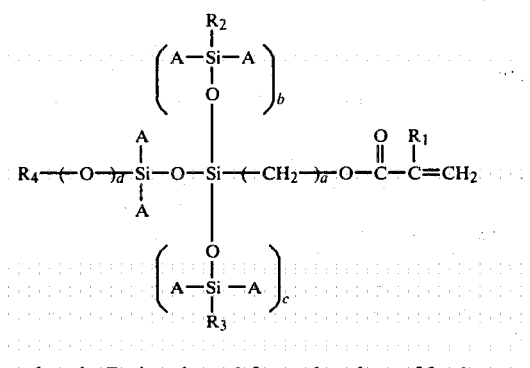

wherein $R_1$ is selected from the class of hydrogen or methyl groups, "a" is an integer from one to five, "b" is an integer from zero to seven, "c" is an integer from zero to two, "d" is an interger from zero to one, A is selected from the class of methyl or phenyl groups, $R_2$ is selected from the class of methyl or phenyl groups, $R_3$ and $R_4$ represent either no group (cyclic ring from "c" to "d") or methyl or phenyl groups.

2. The contact lens material according to claim 1 wherein (c) is a compound selected from the group consisting of methacryloyloxymethyl pentamethyldisiloxane; methacryloyloxypropyl tris(trimethylsilyl)siloxane; methacryloyloxymethyl heptamethylcyclotetrasiloxane; methacryloyloxypropyl heptamethylcyclotetrasiloxane; methacryloyloxypropyl(trimethylsilyl)decamethyl pentasiloxane; and methacryloyloxypropyl dodecamethyl pentasiloxane.

3. The contact lens material according to claim 1 wherein there is 30 to 40 wt.% of (a), 40 to 45 wt.% of (b) and 20 to 30 wt.% of (c).

4. The contact lens material according to claim 3 wherein (c) is methacryloyloxypropyl tris(trimethylsilyl)siloxane.

5. A soft contact lens having 35 to 50 wt.% water which consists essentially of the polymerization product of (a) 20 to 45 wt.% HEMA, (b) 35 to 50 wt.% VP and (c) 25 to 45 wt.% of a compound according to the formula

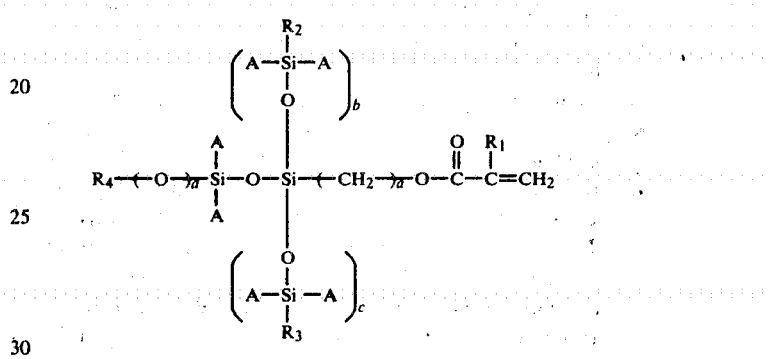

wherein $R_1$ is selected from the class of hydrogen of methyl groups, "a" is an integer from one to five, "b" is an integer from zero to seven, "c" is an integer from zero to two, "d" is an interger from zero to one, A is selected from the class of methyl or phenyl groups, $R_2$ is selected from the class of methyl or phenyl groups, $R_3$ and $R_4$ represent either no group (cyclic ring from "c" to "d") or methyl or phenyl groups.

6. The soft contact lens according to claim 5 wherein (c) is methacryloyloxypropyl tris(trimethylsilyl)siloxane.

7. The soft contact lens according to claim 6 wherein (a) is present in an amount of 30 to 40 wt.%, (b) is present in an amount of 40 to 45 wt.% and (c) is present in an amount of 20 to 30 wt.%.

8. The soft contact lens of claim 7 having a water content of about 42 wt.%.

* * * * *